Figures 1, 2:
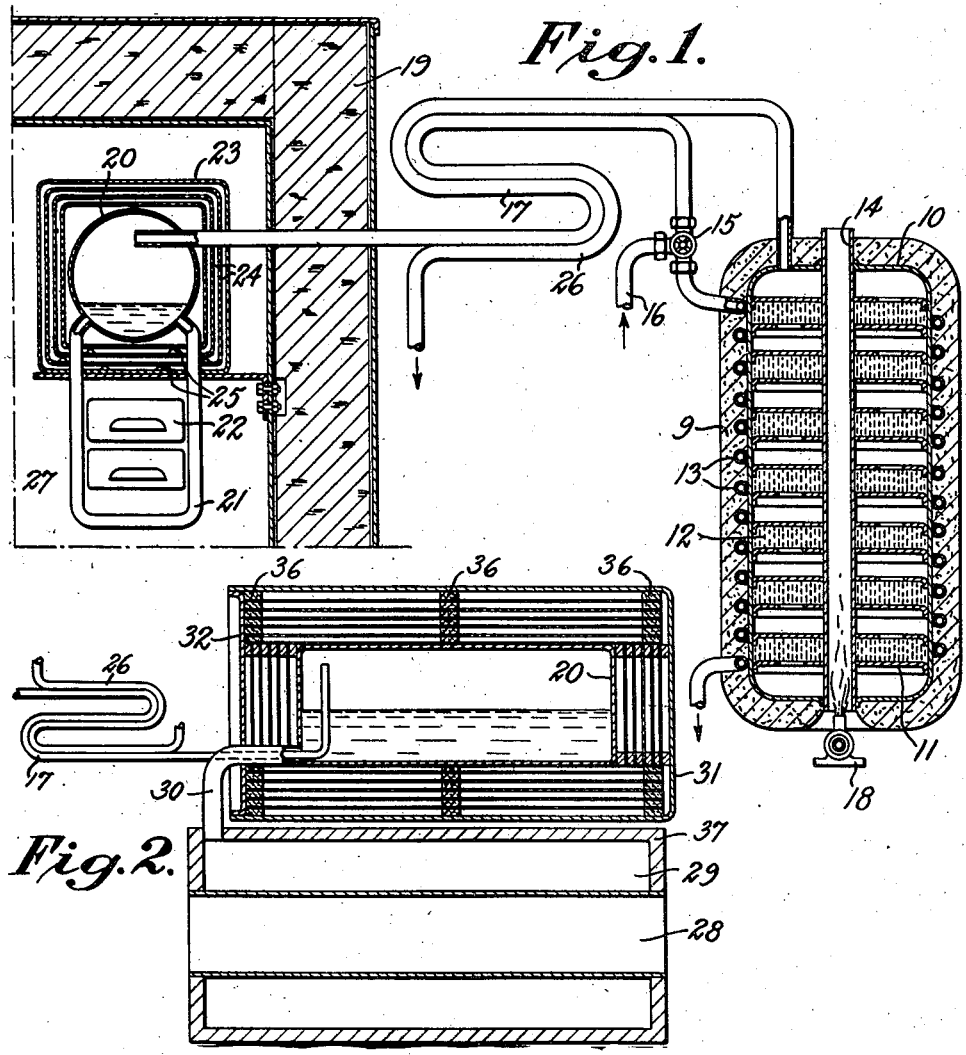

March 17, 1936.   C. G. MUNTERS   2,034,149

REFRIGERATION

Filed May 25, 1932

INVENTOR
Carl Georg Munters
BY Wm T. Hedlund
his ATTORNEY

Patented Mar. 17, 1936

2,034,149

UNITED STATES PATENT OFFICE 2,034,149

REFRIGERATION

Carl Georg Munters, Stockholm, Sweden, assignor to Platen-Munters Refrigerating System, Aktiebolag, Stockholm, Sweden, a corporation of Sweden Application May 25, 1932, Serial No. 613,351
In Germany May 27, 1931

9 Claims. (Cl. 62—126)

This invention relates to refrigerating apparatuses of the intermittent absorption type and more particularly to apparatuses of this type in which the upper part of the evaporator including the header or manifold is surrounded by insulation and in which, in normal operation, the evaporator is always filled with liquid refrigerant to a point within the part enclosed by the insulation. The object of the present invention is to increase the efficiency of and simultaneously to simplify and cheapen the cost of manufacture of refrigerating apparatuses of this kind.

The efficiency of such apparatus depends to a great extent upon the heat capacity of the insulation surrounding the manifold. During the absorption period of the apparatus the evaporator manifold decreases in temperature along with the active part of the evaporator which is in direct heat transmitting relation with the objective of refrigeration. Consequently, there is an extraction of heat from the insulation of the manifold which is directly related to its heat capacity. In the following boiling or condensing period the manifold and its insulation works as the condenser of the apparatus so long as its temperature is lower than the actual condenser of the apparatus which is cooled by an external medium. Consequently, the quantity of heat which is necessary to raise the temperature of the manifold from cold condition to the temperature of the condenser is lost during each cycle of the apparatus. The present invention minimizes this disadvantage to a great extent by providing insulation around the manifold which is of very low heat capacity.

The invention, its nature and advantages will be understood from the following description taken in connection with the accompanying drawing forming part of this specification and showing several embodiments of the invention:

With reference to the drawing:

Fig. 1 shows diagrammatically an intermittent absorption apparatus or system embodying the invention; and Fig. 2 shows a modified form of evaporator in accordance with the invention.

The system includes a generator-absorber 10 which may, for example, contain a plurality of bodies of dry absorption material held between plates 11. Materials which may be used as the absorption medium may be, for example, calcium chloride, strontium bromide, silica-gel, specially prepared charcoal, or mixtures of the above or the above with other substances. The generator-absorber also contains a refrigerant fluid absorbed in the absorbent, of which, for example, sulphur dioxide, ammonia, methylamine, or like refrigerants may be used. Instead of dry absorption material, liquid absorption material may be used, in which case the retaining members for the dry absorption material may be omitted. Water, for example, may be used as an absorption liquid with ammonia as refrigerant.

The generator-absorber 10 is provided with a cooling coil 13 and a flue 14. This vessel may be heated by a gas burner 18 as shown or by any other suitable source of heat such as an electric heating element. Preferably the generator-absorber and its cooling coil are entirely surrounded by suitable insulation as indicated at 9. Connected to the upper part of the generator is a condenser 17 provided with a water cooling conduit 26. Interposed between a water supply conduit 16 and the cooling pipes 13 and 26 for the generator-absorber and the condenser, respectively, is a valve 15 which may be a suitable form of two-way valve permitting flow of water alternatively to the condenser or the generator-absorber. The valve 15 is shown diagrammatically as hand operated. In practice, this valve would probably be automatically operated in accordance with the heating and cooling of the system. The automatic control of such a valve in connection with the heat supply is, however, well known and needs no illustration.

Vapor of refrigerant driven out from the absorption medium in the generator-absorber during the heating period passes to the condenser 17 and thence to the manifold 20 of the evaporator. The manifold 20 and other parts of the evaporator are situated within the space to be cooled 27 which is surrounded by insulation 19. As shown in Fig. 1, the manifold 20 may be of cylindrical shape mounted with its axis horizontal. Projecting downwardly from the manifold 20 are a plurality of tubes 21 connected to the manifold near the bottom thereof. Instead of loop tubes or heat exchangers 21, walls may be provided of spaced metal which may, for example, be corrugated. The tubes 21 are, for the major portion thereof, in direct heat transmitting relation with the air in the food space 27. Ice drawers 22 may be mounted between and supported by tubes 21 in known manner. Also, fins may be applied to the cooling tubes, and other known heat exchange devices may be employed.

In accordance with the invention, the manifold 20 and a part of the tubes 21 are surrounded by insulation 23 which has an exceedingly small heat capacity. This insulation may consist of a plurality of metal plates 24 holding layers of air between them. Preferably the sheets are spaced not more than five millimeters or about two-tenths of an inch apart to assure a stagnant condition of air or gas between the sheets. A plurality of layers are preferably used at the ends as well as the sides of the manifold so that the manifold is completely enclosed with insulating material of low heat capacity. Corner frame pieces may be employed into which the insulation material is set as by being secured in grooves in the corner frame members. Metal sheets of high reflective surface may be used to good advantage since the heat radiation and thereby the heat capacity of the insulation are diminished. Suitable spacing elements may be provided to hold the layers of thin metal apart. For example, projections may be formed in the plates themselves as shown at 25 to provide spacing.

One example of material which may be used to advantage is aluminum foil with a light coating of aluminum oxide which may be developed in the well-known electrolytic way.

The evaporator tubes 21 remain filled with liquid refrigerant during both the heating and absorbing periods. In normal operation the liquid level in the manifold 20 should not be lowered to the points of connection of the tubes 21 therewith. During the heating period the manifold 20 is substantially filled with liquid refrigerant and it is heated up to the condenser temperature. The relatively warm refrigerant forms an upper layer or layers of the liquid in the evaporator while the liquid in the tues 21 remains cold. During the absorption period the refrigerant in the manifold 20 is cooled by evaporation, and therefore boiling of the refrigerant in the tubes 21 takes place.

Instead of forming the insulation of the manifold 20 of rectangular form as shown in Fig. 1, the insulation may be formed cylindrically and may be wrapped around the manifold as shown in Fig. 2.

In this figure the insulation consists of aluminum foils which are wrapped several times around the manifold. In order to hold the different layers apart spacing elements 36 are preferably fastened at the first revolution of the aluminum foils and together with the foils wound around the manifold so as to build up corner frame members as well as one or more spacing columns, as shown in the figure in the middle of the manifold. The side walls of the manifold are suitably insulated by corresponding elements of circular form, which consist of aluminum foils separated by similar spacing elements.

The spacing elements are preferably made of a moisture-resisting material, such as thin ribbons of sponge rubber or the like. It is of advantage for the insulation of cylindrically shaped manifolds to use such bendable material between the bendable aluminum foils as both materials easily can be wrapped around such manifolds.

The evaporator of Figure 2 furthermore differs from that of Figure 1 therein that the evaporator 37 itself consists of two preferably concentrically arranged cylinders. The inner space 28 of the inner cylinder may in a well-known manner be arranged to hold one or more icetrays. Of course the inner cylinder may also be formed in a rectangular shape to receive a plurality of superimposed icetrays. The space 29 between the cylinders is connected to the manifold by a conduit 30, the working of the manifold and the evaporator being the same as described with reference to Fig. 1. The insulation of Fig. 2 is protected against damages from outside by a casing 31, suitably of metal. The casing 31 consists preferably of a vessel, the one end of which is closed by a cover 32 which may be welded or soldered, fastened by screws, or in any other suitable way fastened to the vessel.

What I claim is:

1. In an absorption refrigerating system of the intermittent type, an evaporator having a vessel for refrigerant and heat exchangers extending from said vessel, a jacket for said vessel formed of insulation of relatively small heat capacity, said jacket including thin sheets of metal foil with highly reflective surfaces and with air or gas spaces between the sheets, the construction being of a character to maintain the air or gas between the sheets in a substantially quiet condition thereby substantially preventing convective heat transfer within the spaces.

2. In an absorption refrigerating system of the intermittent type, an evaporator having a vessel for refrigerant and heat exchangers extending from said vessel, a jacket for said vessel formed of insulation of relatively small heat capacity, said jacket including heat reflecting sheets with air or gas spaces between the sheets, the construction being of a character to maintain the air or gas between the sheets in a substantially quiet condition thereby substantially preventing convective heat transfer within the spaces, said jacket being substantially devoid of solid material having good heat conducting properties.

3. In an absorption refrigerating system of the intermittent type, an evaporator having a vessel for refrigerant and heat exchangers extending from said vessel, a jacket for said vessel formed of insulation of relatively small heat capacity, said jacket including heat reflecting sheets with air or gas spaces between the sheets, the construction being of a character to maintain the air or gas between the sheets in a substantially quiet condition thereby substantially preventing convective heat transfer within the spaces.

4. In an absorption refrigeration system of the intermittent type, an evaporator having a vessel for refrigerant, heat exchangers extending from said vessel, insulation of relatively small heat capacity about said vessel, said insulation being formed of relatively thin sheet material providing gas spaces arranged to maintain the gas in a quiet state.

5. Refrigerating apparatus comprising a vessel for refrigerant, insulation of relatively small heat capacity about said vessel, said insulation being formed of thin sheet material and with gas spaces between the same, the sheet material being arranged to maintain the air in a quiet state, and heat exchange means in communication with said vessel projecting outwardly beyond said insulation.

6. In a refrigerating system a vessel for containing refrigerant, insulating material of relative small heat capacity enclosing said vessel and formed of reflecting metal sheets spaced apart and containing air in a quiet state therebetween, and heat exchange means in communication with said vessel projecting outwardly beyond said insulation.

7. Refrigerating apparatus comprising a vessel for containing refrigerant, insulating material of relatively small heat capacity enclosing said vessel, said insulating material comprising sheets separated by stagnant air, and heat exchange means in communication with said vessel projecting outwardly beyond said insulation.

8. Refrigerating apparatus comprising a vessel for refrigerant, insulation of relatively small heat capacity about said vessel, said insulation being formed of thin sheet material, the sheets of which are spaced less than two-tenths of an inch apart to provide gas spaces between the same, the sheet material being arranged to maintain the air in a quiet state, and heat exchange means in communication with said vessels projecting outwardly beyond said insulation.

9. Refrigerating apparatus comprising a vessel for refrigerant, insulation of relatively small heat capacity about said vessel, said insulation being formed of thin sheet material and with gas spaces between the same, the sheet material being arranged to maintain the air in a quiet state, heat exchange means in communication with said vessel projecting outwardly beyond said insulation, and moisture resisting material between said sheets.

CARL GEORG MUNTERS.